United States Patent [19]

Gaffney et al.

[11] Patent Number: 4,766,642
[45] Date of Patent: Aug. 30, 1988

[54] HANDLE ASSEMBLY

[75] Inventors: Thomas E. Gaffney, Sheboygan; Alan J. Weir, New Holstein; Brent W. Lillesand, Kohler; Jeffery E. Collins, Sheboygan Falls, all of Wis.

[73] Assignee: Kohler Co., Kohler, Wis.

[21] Appl. No.: 91,419

[22] Filed: Aug. 31, 1987

[51] Int. Cl.⁴ ............................................. B25G 3/28
[52] U.S. Cl. ................................. 16/121; 16/DIG. 30
[58] Field of Search .................... 16/121, DIG. 30; 74/553, 557; 137/315, 359, 360

[56] References Cited

U.S. PATENT DOCUMENTS

| D. 224,225 | 7/1972 | Doman . |
| D. 285,827 | 9/1986 | Hill et al. . |
| 3,396,604 | 8/1968 | Samuels et al. . |
| 3,965,528 | 6/1976 | Kissler . |
| 4,306,468 | 12/1981 | Bolgert . |
| 4,525,894 | 7/1985 | Knapp . |
| 4,565,350 | 1/1986 | Rozek . |
| 4,593,430 | 6/1986 | Spangler et al. ..................... 16/121 |
| 4,608,882 | 9/1986 | Howie, Jr. . |
| 4,616,673 | 10/1986 | Bondar . |

Primary Examiner—M. Jordan
Attorney, Agent, or Firm—Quarles & Brady

[57] ABSTRACT

A decorative handle which is attachable to a rotatable stem and has a decorative insert held therein is disclosed. In one version, the insert member is retained by a retainer assembly which engages the decorative insert. The retainer assembly holds the insert against a narrowed open top of the handle from below. A collar member which is threaded onto the handle from the bottom provides the force to hold the retainer in place. A decorative handle is provided which can be assembled and disassembled without tools, yet is highly aesthetic as the engagement of the component parts is obstructed from view as is a portion of the attachment to the valve assembly. Further, the inserts can be readily changed when the room where the handle is placed is remodeled.

15 Claims, 3 Drawing Sheets

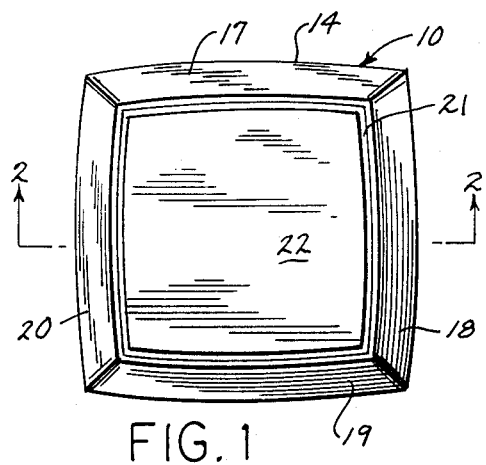
FIG. 1
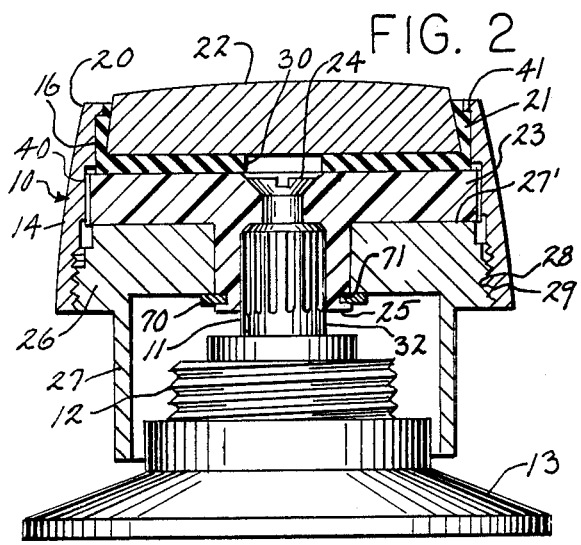
FIG. 2
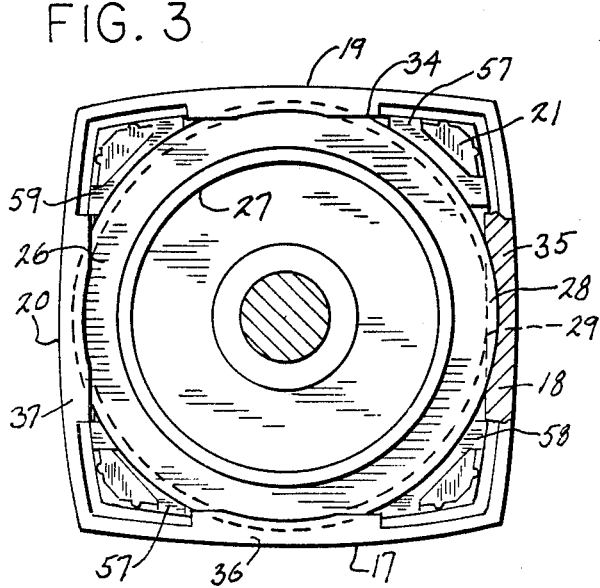
FIG. 3
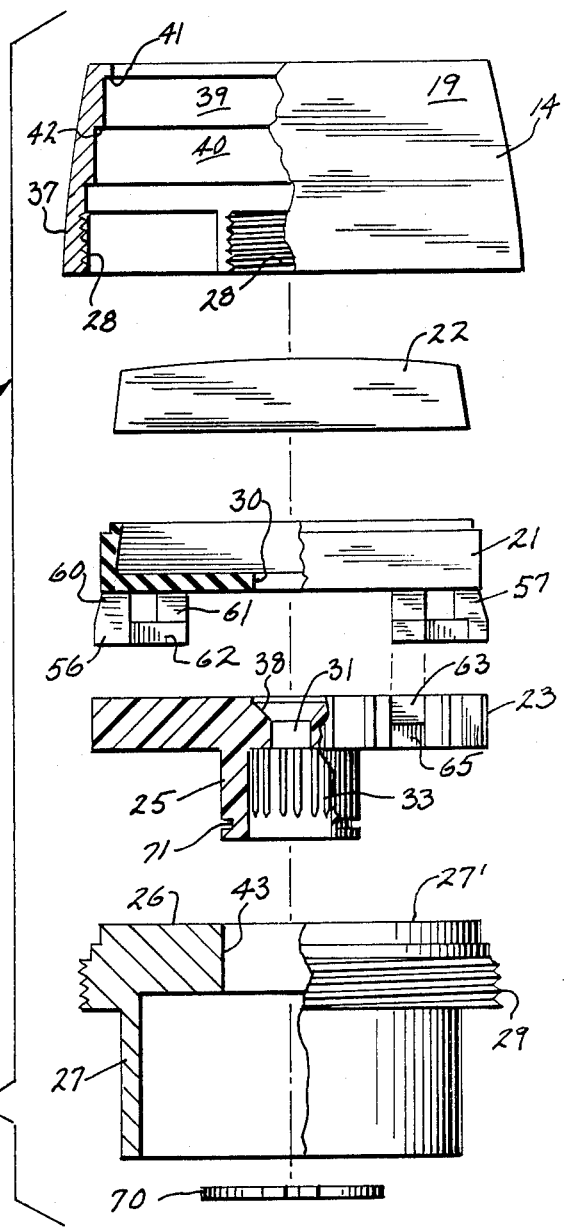
FIG. 4
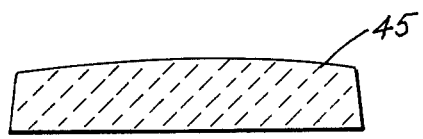
FIG 12A
FIG. 12B U.S. Patent  Aug. 30, 1988  Sheet 3 of 3  4,766,642

HANDLE ASSEMBLY

BACKGROUND OF THE INVENTION

This invention relates to decorative handles which are attachable to rotatable stems and have decorative inserts placed therein. It appears especially useful for a plumbing valve handle.

There are currently available decorative handles with replaceable decorative inserts for attaching to the handle. Such handles are desirable as they permit the valve handle decor to be changed to conform to whatever decoration is used in a bathroom or other room during the life of the fitting. For example, in U. S. Pat. No. 4,525,894 (FIG. 2) there is shown one type of handle with a replaceable insert. However, this prior art handle is held in place by a member projecting through the side of a handle which has negative aesthetic aspects, may trap soap and water, and may have a significant risk of vandalism if the handle were used in a public place.

Other prior art insert members involve the use of a friction fit type insert cap (such as shown in U. S. Pat. No. 3,965,528) which are pressed down from the top. However, these involve the disadvantage of easy removal by vandals, and are formed with bumps or ridges on the top of the cap to permit disassembly.

Still other units require the gluing of an insert member to the handle. This makes it difficult for a consumer to change handle appearance by changing inserts.

It is therefore an object of the present invention to provide a handle assembly wherein an insert member can be retained in the handle body in a secure manner and without requiring any adhesive or projections through the side of the knob. Other objects are a handle assembly which can be assembled or disassembled without tools, and provides an attachment for the insert member so that accumulation of foreign material around the insert edge or in the knob interior is retarded.

SUMMARY OF THE INVENTION

The foregoing objects are accomplished and the shortcomings of the prior art are overcome by the present handle assembly. It is attachable to a rotatable stem and of the type having a handle knob with outer side surfaces, an internal through bore extending from a stem end to a decorative end, and an outer removable decorative end cap positionable at the decorative end. The handle assembly includes adaptor means connectable to the stem and knob interior so that all three can rotate together. Attachment means is removably connectable to the inside of the housing without projecting through the side surfaces of the knob to cause the cap to be held in a portion of the bore adjacent to the decorative end with a decorative end of the cap visible on the knob exterior. When the assembly is assembled the decorative end cap cannot be readily disassembled from the knob without first adjusting the attachment means from the stem end of the knob.

In one embodiment, the adaptor means is integral with the knob and a flexible cup surrounds portions of the stem end and the sides of the end cap to frictionally retain the cap in the cup. The cup also has a projection extending towards the stem end. An escutcheon is insertable in and connected to the knob bore stem having an end abutment surface. The abutment surface acts against the projection to increase the engagement of the cap and cup to aid in its removal.

In another embodiment, the escutcheon is insertable in the knob stem end and has threads formed on its radial periphery and an end support surface. Inner threads are on the inside of the housing side surfaces. This provides a meshing of the inner and radial threads causing the support surface to hold a support wall of the adaptor in the housing.

In another embodiment, the handle assembly has a decorative insert member with a handle defining a cavity that converges along at least a part of it to define a stem attachment end and a decorative end. A retainer assembly is adapted to engage the insert member. The retainer assembly and the handle are constructed and arranged to restrict movement of the retainer assembly with said insert member through the decorative end. A collar member has a threaded portion for engagement with a threaded portion on the handle. The handle, the retainer assembly and the collar member are constructed and arranged to exert a driving force on the retainer assembly in the direction of the decorative end when the threaded portions on the collar member and the handle engage. Means are also provided to secure the handle assembly to a rotatable stem. In a preferred manner, the threaded portion of the collar member is defined by an external threaded portion and the threaded portion of the handle is defined by internal threads disposed in side walls of said handle.

In another embodiment, the handle defines a cavity that converges along at least a part of it to define a stem attachment end and a decorative end. The panel portion extends laterally across the cavity and has at least one opening therethrough. A holder member is adapted to engage the insert member, and the holder member and the handle are constructed and arranged to restrict movement of the holder member with said insert member through the decorative end, with the holder member having a leg member for placement through the panel opening in said panel portion. A collar member has a threaded portion for engagement with a threaded portion extending from the panel portion of the handle. The collar member and the leg member are constructed and arranged to exert a driving force on the holder member when the collar member contacts the leg and moves the holder member in the direction of the smaller decorative end when the threaded portions on the collar member and the handle engage.

Stated more specifically, the panel portion has a plurality of the openings extending therethrough and the holder member has a plurality of leg members for placement through the openings.

The foregoing objects and still other objects and advantages of the invention will be apparent from the description which follows. In the detailed description which follows, the preferred embodiments of the invention will be described with reference to the accompanying drawings. These embodiments do not represent the full scope of the invention. Rather the invention may be employed in still other embodiments. Reference should be made to the claims herein for interpreting the breadth of the invention.

BRIEF DESCRIPTION OF THE DRAWINGS

FIG. 1 is a top plan view of a first embodiment of this invention;

FIG. 2 is a view in vertical section taken along line 2—2 of FIG. 1;

FIG. 3 is a bottom plan view of the handle assembly shown in FIGS. 1 and 2;

FIG. 4 is an exploded frontal view of the handle assembly shown in the previous FIGS. 1-3, with certain portions shown in section;

FIGS. 12A and 12B are views in vertical section showing alternative embodiments of insert member 22.

DESCRIPTION OF THE PREFERRED EMBODIMENTS

Figure 5:
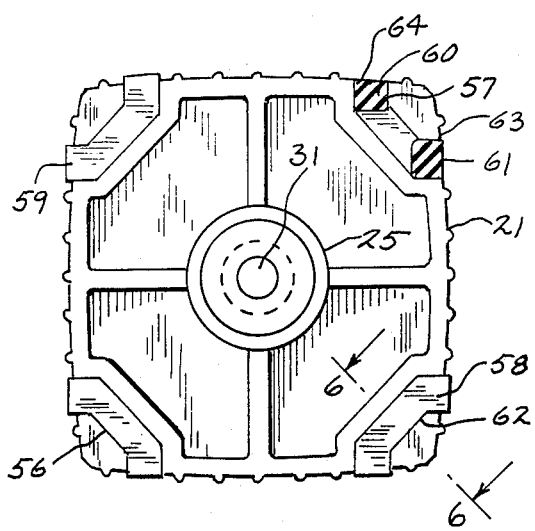
FIG. 5 is a bottom plan view, partially in section of member 23 when assembled to member 21.

Proceeding to a detailed description of the preferred embodiments of the invention, one valve handle assembly 10 is shown in FIGS. 1-4. It is designed for use in conjunction with the usual splined valve stem end 11 having the threads 12 for engagement with the usual escutcheon 13.

Handle knob 14 has side walls 17, 18, 19 and 20 to provide a bore or cavity 16 for a decorative insert 22. A holder member 21 is in the form of a cup for surrounding the insert 22 on portions of the sides and the bottom. The holder member 21 and a retainer member 23 comprise an adaptor means or a retainer assembly for the insert 22.

The retainer member 23 is housed in the handle 14 and has internally splined skirt 25 extending therefrom for surrounding the valve stem end 11. A rotatable collar 26 has outer threads 29 for engaging with internal threads 28 of the handle 14. The collar 26 also has a cylindrical skirt 27 extending therefrom for surrounding the threads 12 of the valve stem as well as a portion of the escutcheon 13. The collar also has an end support surface 27'.

As best seen in FIG. 3, the handle 14 is of a substantially rectangular configuration while the collar 26 is rounded. The internal threads 28 of the handle 14 will be positioned in the arcuate boss portions 34, 35, 36 and 37 of handle 14 for engagement with the circumferential threads 29 of the collar 26.

Figure 6:
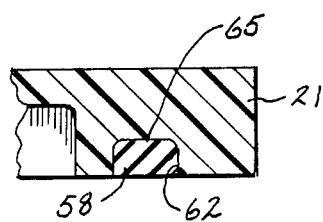
FIG. 6 is a sectional view taken along line 6—6 of FIG. 5.

Referring to FIGS. 5-6, the holder member 21 is retained on the retainer member 23 by four strap members 56, 57, 58 and 59. Each strap member has two legs 60 and 61 which are interconnected by a cross connector 62. The retainer member 23 has lateral grooves 63 and 64 and the bottom has an interconnecting diagonal groove 65 placed at each corner of the retainer member 23 to receive the legs 60 and 61 and the cross connector 62. The strap members 56-59 as well as the holder member 21 are composed of an elastic material (e.g. rubber) so that the legs 60 and 61 and the cross connector 62 are received in the grooves 63, 64 and 65 in a stretch fitting manner.

Figure 7:
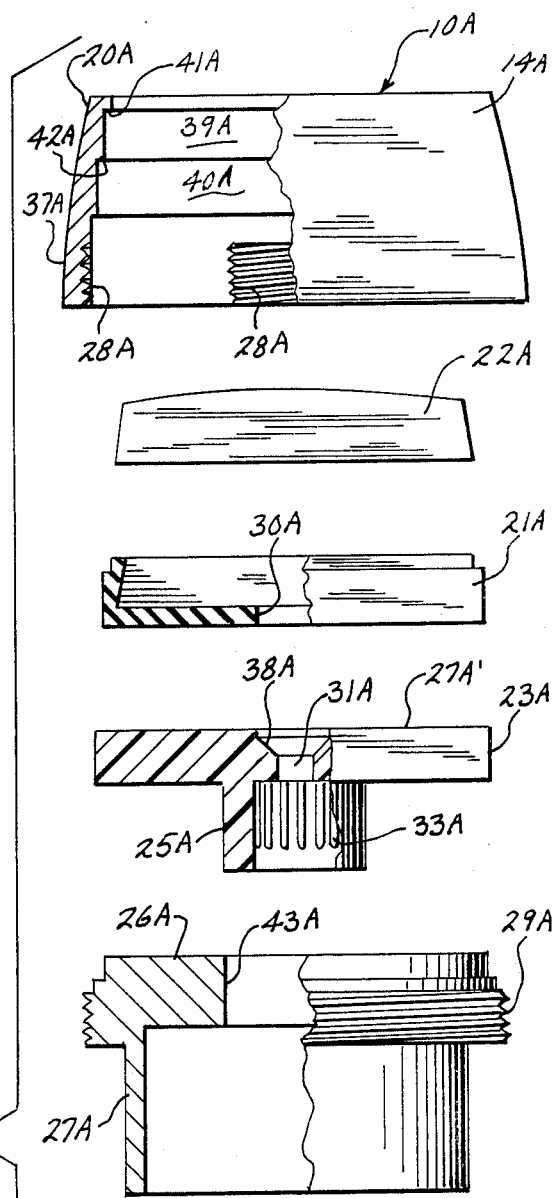
FIG. 7 is a view similar to FIG. 4 showing another embodiment.

An alternative embodiment is shown in FIG. 7. Similar numbers refer to similar parts as in the previous embodiment except they include the letter "A." The difference between previous embodiment 10 and this embodiment 10A is that the holder member 21A does not include the straps 56-59 for engagement with the retainer member 23A.

Another alternative, although less preferred, embodiment is shown in FIGS. 8-11. Similar numbers refer to similar parts as in the previous embodiment except they include the letter "B." One major difference between previous embodiments 10 and 10A and this embodiment 10B is that the handle 14B has an intermediate panel portion 52. Another difference is that the retainer member 23 is not utilized but instead the retainer assembly includes only the holder member 21B having the four legs 48 with the projections 50 for placement through the openings 53 in the panel portion 52. Further, collar 26B has internal threads 29B and the handle has its threads disposed inside the collar.

Assembly And Operation

A better understanding of the advantages of the valve handle assemblies of 10, 10A and 10B of this invention will be had by a description of their assembly and operation. Turning to assembly 10 first, and specifically to FIGS. 2 and 4, the skirt 27 of the collar 26 is positioned over the escutcheon 13 and the threads 12 substantially as shown in FIG. 2. The holder member 21 is then secured to the retainer 23 by placing the straps 56-59 in the grooves 63-65. The skirt 25 of the retainer member 23 is inserted through the central opening 43 of the collar member 26. The splines 33 in the skirt 25 are positioned in contact with the splines 32 of the valve stem 11.

A screw 24 will then be inserted in through the passage 30 of the holder member 21 as well as the passage 31 of the retainer member 23 to engage internal threads in the valve stem 11 as well as to engage the chamfered portion 38. The insert member 22 is next placed in the cuplike holder member 21. The handle 14 is brought down over the insert member 22 and the retainer member 23 so that the insert member 22 and the holder member 21 are positioned in compartment 40 at the upper decorative end of the cavity. At this stage the threads 28 will engage the threads 29 of the collar member 26. Rotation of the the collar member 26 with respect to knob 14 causes further engagement of the threads 28 and 29 which causes the retainer member 23 to seat in the compartment 39 as indicated in FIG. 2.

The retainer member 23 is dimensioned so that the increasingly upward force exerted by the collar member 26 thereon is placed on the cup 21 and in turn effects an engagement against the shoulder 41 of the narrowed compartment 39 by the holder member 21. This then tightly secures the insert member 22 in the handle 14 with the assembled unit shown in FIG. 2. Subsequent rotation of the knob 14 turns the adaptor/retaining member 23, carrying with it holder/cup 21, collar/escutcheon 26 and valve stem 11.

Handle 10A is assembled in the same manner as previously indicated for handle 10 except that there is no need to attach any strap members such as 56-59 to the retainer 23A. In this instance holder member 21A will be forcibly retained in the compartment 39A in the same manner as holder member 21 is in compartment 39 when the collar 26A with threads 29A is threaded onto the threads 28A and forces the top 27A' of retainer 23A against the holder member 21A in the manner indicated in FIG. 2 for comparable components.

To assemble the handle assembly 10B, the legs 48 of the cuplike holder member 21B and having the projections 50 are inserted through the passages 53 of the panel portion 52 of the handle 11B. The threads 28B of the handle 14B are partially threaded onto the threads 29B of the collar member 26B. The collar member 26B is placed over the valve stem 11 and the escutcheon 13 in the manner for the collar member 26. The skirt 25B of the handle 14B is thereby placed over the valve stem 11 and the splines 33A engage the splines 32 of the valve stem 11. Screw 24 is inserted in through a passage in the holder member 21B and the passage 31B in the panel portion 52. An undercut portion 38B will be included at the top of the passage 31B to accommodate the head of the screw and hold the handle 14B on the valve stem 11. Insert 22B is placed in holder member 21B and is frictionally held therein by the side walls such as 51 which are slightly compressed by the outward divergence of insert 22B and as shown at 55 in FIG. 9. In this position legs 48 are free of contact with collar 26B. To remove the insert 22B and the holder member 21B the collar 26B is rotated so that the threads 29B and 28B further engage. This rotation will continue until the top 49 of the collar member 26B engages the legs 48. Further engagement forces the projections 50 through the passages 53 to thereby afford removal of the cup holder 21B and the insert 22B.

Figure 13:
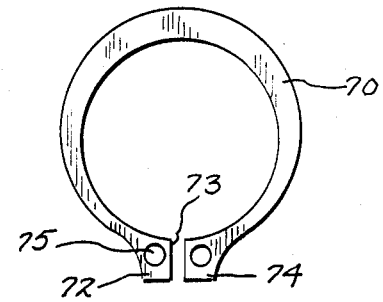
FIG. 13 is a top plan view of a retaining ring.

If desired, as an optional feature, a retaining ring 70 can be utilized for rotative retention of the retainer member 23 to the collar 26. As best seen in FIG. 13, the retainer ring has two enlarged portions 72 and 74 separated by a slot 73. Openings 75 are for the purpose of engagement with pins of a pliers so as to separate the enlarged portions for placement of the ring 70 in groove 71. Retainer ring 70 is thereby accommodated in a resilient manner in annular groove 71 of the skirt 25. This is best seen in FIGS. 2 and 4. The reason for having the retainer member 23 rotatably mounted to the collar 26 is to prevent the skirt 27 from contacting and scratching the escutcheon 13 during disassembly of the handle 14 from the collar 26. If the retaining ring 70 were not employed, the collar 26 would be free to fall from the skirt 25. It will be appreciated that before skirt 27 is placed over the escutcheon 13 the retaining ring 70 will be secured to the skirt 25. While retaining ring 70 is shown in the handle assembly 10, it can also be advantageously employed in embodiment 10A. Similarly, suitable retention means could be utilized in conjunction with threads 28B and 29B of embodiment 10B.

Figure 8:
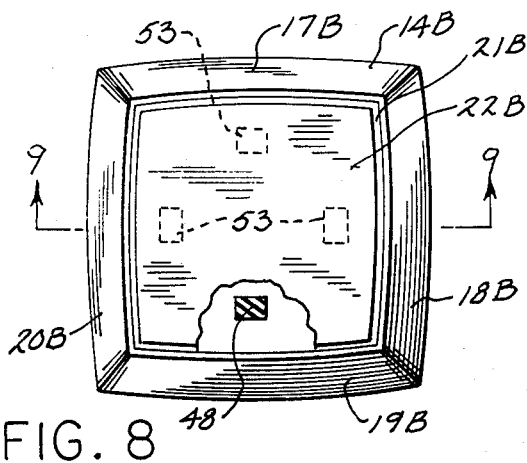
FIG. 8 is a view similar to FIG. 1, but in partial section, and showing a third embodiment of the handle assembly.
Figure 9:
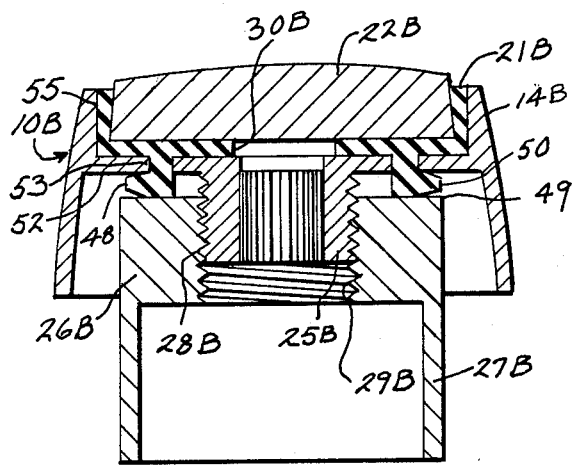
FIG. 9 is a sectional view taken along line 9—9 of FIG. 8.
Figure 11:
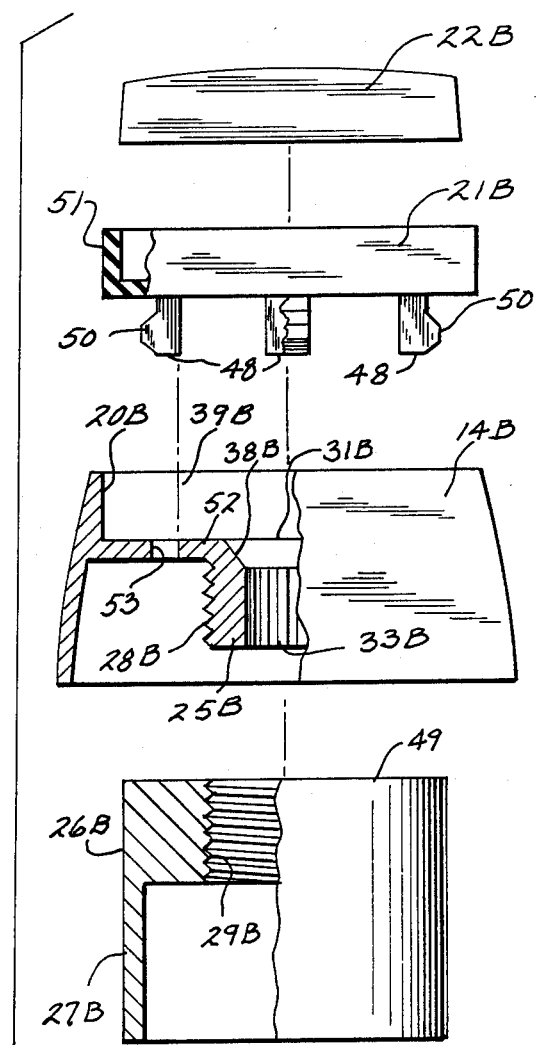
FIG. 11 is an exploded frontal view of the handle assembly shown in FIGS. 8-10 with certain portions shown in section.
Figure 10:
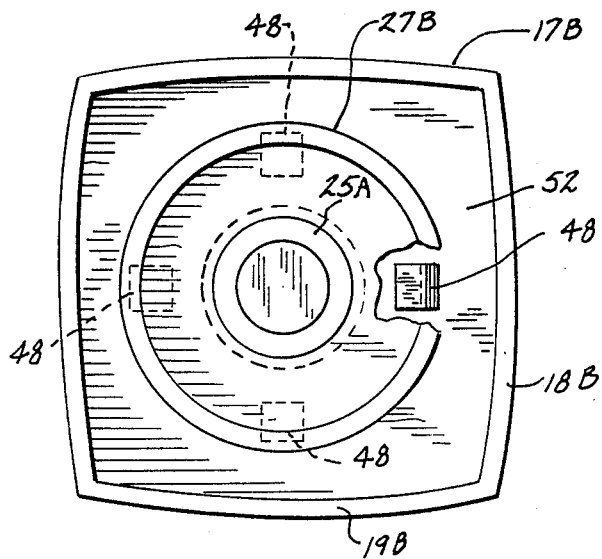
FIG. 10 is a bottom plan view of the handle assembly shown in FIGS. 8 and 9.

As indicated in FIGS. 12A and 12B different types of insert members can be utilized in conjunction with the handle assembly. As seen therein, the numeral 45 indicates an insert member of a ceramic material whereas insert 46 indicates one made of wood. Insert members 22, 22A and 22B are of a metallic material. While these members have been shown to have a plain upper surface as indicated in FIGS. 1 and 8, they could include numerous types of decorative illustrations and depictions including the usual hot and cold descriptions.

It will thus be seen that there is now provided an improved handle assembly for an insert which is simple in its construction yet provides an aesthetic looking handle while at the same time preventing entry of foreign matter around the insert. Also, since the means of disassembly is not apparent to the untrained, the risk of vandalism is reduced. The handle assembly is easily placed onto a valve stem and readily removed therefrom without the need of any special tools. In the instance of handle assemblies 10 and 10A, these assemblies are especially interesting in that they provide for a round collar member to engage a square handle; surprisingly, a round peg is placed in the square hole!

While certain preferred embodiments have been described above, it should be apparent to those skilled in the art from this disclosure that a number of other modifications and changes can be made to these embodiments without departing from the spirit and scope of the invention. Therefore, it is intended that the scope of the invention should not be limited by a description of the preferred embodiments, but rather by the claims which follow.

We claim:

1. A handle assembly having a decorative insert member comprising:

a handle defining a cavity that converges along at least a part of it to define a stem attachment end and a decorative end;

a retainer assembly adapted to engage said insert member, said retainer assembly and said handle constructed and arranged to restrict movement of said retainer assembly with said insert member through said decorative end;

a collar member having a threaded portion for engagement with a threaded portion on said handle;

said handle, said retainer assembly and said collar member being constructed and arranged to exert a driving force on said retainer assembly in the direction of said decorative end when said threaded portions on said collar member and said handle engage; and means to secure said handle assembly to a rotatable stem.

2. The handle assembly as defined in claim 1 wherein said threaded portion of said collar member is defined by an external threaded portion and said threaded portion of said handle is defined by internal threads disposed in side walls of said handle.

3. The handle assembly as defined in claim 1 wherein said threaded portion of said collar member is defined by an internal threaded portion.

4. The handle assembly as defined in claim 3 wherein said retainer assembly comprises a cup with strap members extending therefrom and an end portion of an adaptor attachable to said stem, the end portion of the adaptor defining portions for receiving said strap members to connect the cup to the adaptor.

5. The handle assembly as defined in claim 1 wherein said retainer assembly and said collar member are rotatably mounted to each other.

6. In a handle assembly attachable to a rotatable stem, of the type having a handle knob with outer side surfaces, an internal through bore extending from a stem end to a decorative end, and an outer removable decorative end cap positionable at the decorative end, the improvement comprising:

adaptor means connectable to the stem and knob interior so that all three can rotate together; and attachment means removably connectable to the inside of the housing without projecting through said side surfaces of the knob to cause the cap to be held in a portion of the bore adjacent to said decorative end with a decorative end of the cap visible on the knob exterior;

whereby when the assembly is assembled the decorative end cap cannot readily be disassembled from the knob without first adjusting said attachment means from the stem end of the knob.

7. The assembly of claim 6, wherein the adaptor means is integral with the knob.

8. The assembly of claim 1 further comprising:
a flexible cup which can surround portions of the stem end and the sides of the end cap to frictionally retain the cap in the cup;
said cup also having a projection therefrom extending towards said stem end; and
an escutcheon insertable in and connectable to the knob bore stem end having an end abutment surface;
whereby said abutment surface acting against said projection can increase the frictionable engagement of said cap and cup.

9. The assembly of claim 1, wherein the end cap is assembled to the assembly by passing it through the knob bore from the stem end to a narrowed decorative end of the bore.

10. The assembly of claim 9, wherein the attachment mean comprises:
an escutcheon insertable in the knob stem end having threads formed on to radial periphery and an end support surface; and
inner threads on the inside of the housing side surfaces;
whereby a meshing of the inner and radial threads causes the support surface to hold a support wall of the adaptor in the housing.

11. The assembly of claim 10, wherein the support wall is sandwiched between the cap and support surface.

12. The assembly of claim 10, wherein a flexible cup surrounds portions of the stem end and sides of the cap when it is assembled in the assembly, and is sandwiched between the cap and support wall when so assembled.

13. A handle assembly having a decorative insert member, comprising:
a handle defining a cavity that converges along at least a part of it to define a stem attachment end and a decorative end;
a panel portion extending laterally across the cavity having at least one opening therethrough;
a holder member adapted to engage said insert member, said holder member and said handle constructed and arranged to restrict movement of said holder member with said insert member through said decorative end, said holder member having a leg member for placement through said panel opening in said panel portion;
a collar member having a threaded portion for engagement with a threaded portion extending from said panel portion of said handle, said collar member and said leg member constructed and arranged to exert a driving force on said holder member when said collar member contacts said leg and moves said holder member in the direction of said smaller decorative end when said threaded portions on said collar member and said handle engage; and
means to secure said handle to a rotatable stem.

14. The handle assembly as defined in claim 13 wherein said holder member includes a cup portion for holding said insert member.

15. The handle assembly as defined in claim 14 wherein said panel portion has a plurality of said openings extending therethrough and said holder member has a plurality of leg members for placement through said openings.

* * * * *